Aug. 16, 1938.  A. E. G. BERNER  2,126,865
GRAVELING DEVICE FOR SPRAYING OF GRAVEL IN
FRONT OF THE WHEELS OF AN AUTOMOBILE
Filed March 2, 1936
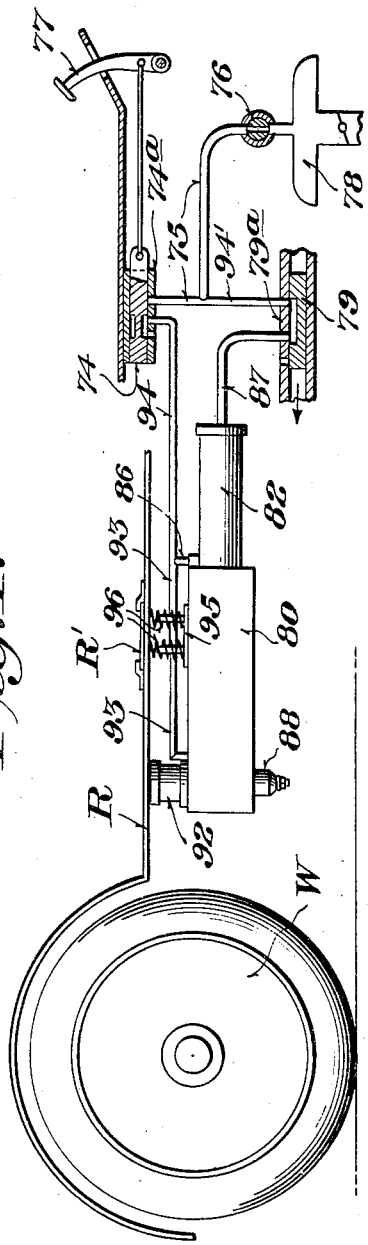
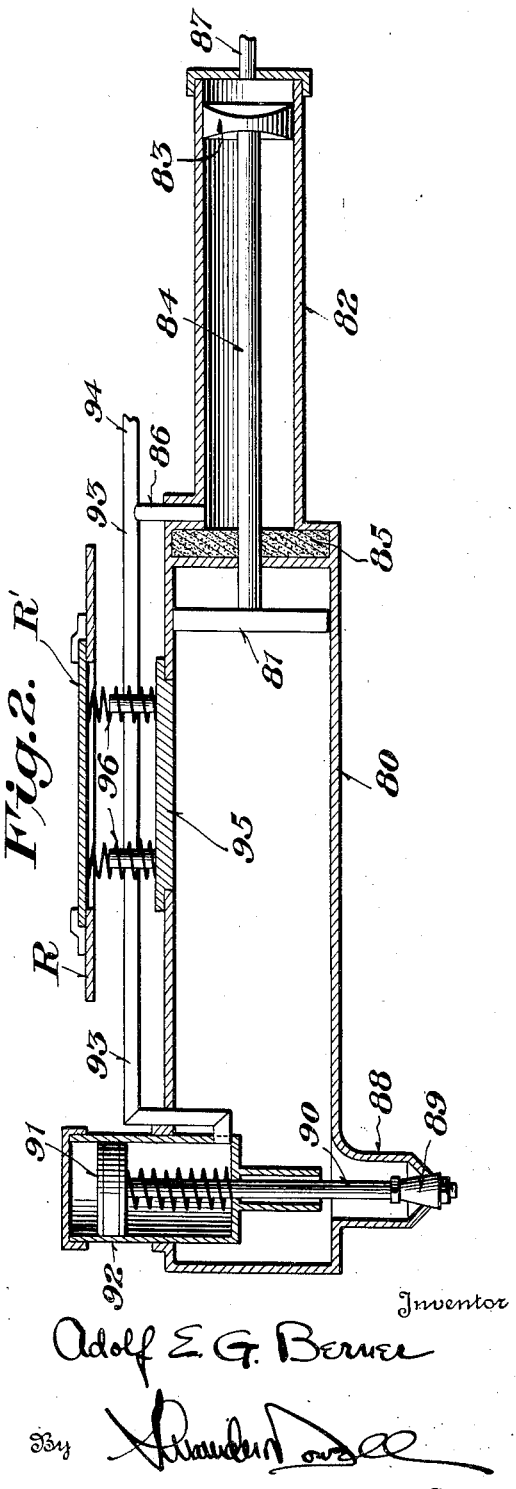
Inventor
Adolf E. G. Berner
By
Attorneys Patented Aug. 16, 1938

2,126,865

UNITED STATES PATENT OFFICE 2,126,865

GRAVELING DEVICE FOR SPRAYING OF GRAVEL IN FRONT OF THE WHEELS OF AN AUTOMOBILE

Adolf Erhardt Georg Berner, Copenhagen, Denmark, assignor of three-fourths to Elias Feldmann, Charlottenlund, near Copenhagen, Denmark Application March 2, 1936, Serial No. 66,765
In Denmark April 17, 1935

4 Claims. (Cl. 291—25)

The present invention relates to devices for spraying gravel in front of the wheels of automobiles, of the type consisting of gravel boxes provided with valved outlets which may be automatically opened upon operation of the brakes, pistons in the boxes urging the gravel towards the valved outlets.

The main object of the invention is to provide inexpensive, simple and reliable means for operating the said valves and for urging the said pistons towards the valved outlets, and with this object in view the graveling device according to the invention comprises, in association with the intake manifold and the brake operating means of the automobile, one or more gravel boxes each having an outlet at one end; a valve for closing and opening such outlet; an expansible chamber having a movable wall operatively connected with each said valve; each said valve being closed when the chamber is expanded, means for normally connecting the chamber to the atmosphere whereby said chamber is expanded, and for connecting the chamber to the intake manifold when the brake operating means is actuated whereby said valve is opened; a piston in each said container, and means for urging each piston towards the outlet end of its container comprising a cylinder attached to the end of each container opposite from the outlet end; a second piston connected with the first piston and slidable in said cylinder; means for normally connecting the end of such cylinder intermediate the pistons to the atmosphere and for connecting said end of the cylinder to the intake manifold when the brake operating means is actuated, the opposite end of said cylinder being exposed to the atmosphere.

But in order that my invention may be more readily understood, reference will now be had to the accompanying drawing, in which Fig. 1 illustrates an elevation, partly in section, of a vehicle equipped with one form of a gravel box and valve and piston actuating mechanisms according to the invention.

Fig. 2 is a longitudinal section through the gravel box.

In Fig. 2, 80 is the gravel box and 81 a plunger therein, and a gravel box 80 is arranged in front of each rear wheel W of the automobile. The gravel box 80 is preferably fixed below the running board or one of the platform steps R of the automobile at a certain distance below same, and the gravel box 80 is fitted with a detachable cover 95 maintained in position by springs 96, the upper ends of which rest against a detachable cover plate R' closing an opening in the platform step R.

The gravel box 80 has an extension 82 at one end containing a piston 83 which is connected to the piston 81 by a rod 84 passing in an air-tight manner through a packing 85. At the inner end of the extension 82 is a pipe 86 which may be connected through suitable valve means to the atmosphere or to the intake manifold 78 of the motor of the vehicle carrying the graveling device when the brake pedal 77 of this vehicle is depressed. At the outer end of extension 82 is a pipe 87 which may also be connected through suitable valve means to the atmosphere, or to the intake manifold 78 for the purpose hereinafter set forth.

At the end of the gravel box 80 remote from the extension 82 is a vertical discharge spout 88 which is closed by means of a cone valve 89. The latter is connected, by means of a rod 90, to a spring-actuated piston 91 located in an air-tight cylinder 92 so as to form an expansible chamber between its under surface and the bottom of the cylinder. A pipe 93 enters said expansible chamber 92 and may also be connected through suitable valve means to the atmosphere or to intake manifold 78 of the motor. The pipes 93 and 86 are joined together to form a pipe 94 leading to the valve means shown in Fig. 1 so that in one position of the valve when the brake pedal 77 is depressed, vacuum from the intake manifold 78 propagates through pipes 94, 93 and 86 and will serve to open the valve 89, and also to drive the piston 81 to the left (Fig. 2).

As shown in Fig. 1, pipe 94 leads to the middle port of a casing 74ª for a slide valve 74, and a pipe 75 extends from the intake manifold 78 of the motor to one end port of the casing 74ª. In this last mentioned pipe a supplementary valve 76 is provided. In Fig. 1 the valve 74 is shown in normal position, the recess in the slide valve 74 bridging the center port and the end port which opens into the atmosphere, whereby atmospheric pressure is admitted into the cylinder 92 through pipes 94 and 93, and atmospheric pressure admitted into the extension 82 through pipe 86 between the packing 85 and piston 83. The slide valve 74 is linked to the brake pedal 77 of the automobile, and when the pedal is pressed to the right (Fig. 1) connection between the pipes 94 and 75 will be established if the valve 76 is open, since the slide valve 74 will be shifted so that the recess in the valve bridges the corresponding ports of pipes 94 and 75, admitting suction into pipe 94, and piston 91 will consequently be drawn by the suction of the motor downwardly in cylinder 92 so as to open the valve 89. If, on the contrary, the valve 76 is closed, depression of the brake pedal 77 will have no effect on the valve of the graveling device. In other words, by means of the valve 76 the graveling device can at will be set into or out of operative state, i. e., the state in which it is ready to enter into operation, when the brake pedal is actuated.

Whenever suction is admitted into pipe 94, the same will be admitted also through pipe 86 to the extension 82 at the side of piston 83 adjacent stuffing 85 and consequently piston 83 will be urged to the left (Fig. 2) and plunger 81 will be actuated to move the gravel in box 80 towards the outlet 88 which is also opened by suction in cylinder 92.

In practice, two pipes 94 would connect valve casing 74ª with the gravel boxes arranged in front of each of the two rear wheels of the automobile, or the two pipes may comprise a single branched pipe leading to the same port of the slide valve casing.

Whenever it is desired to retract the piston 81 in the gravel box 80, i. e., move same to the extreme right hand end (Fig. 2) of the box in order to fill the gravel box with fresh gravel, it is merely necessary to connect the pipes 86 and 93 to the atmosphere, which is the normal position of the slide valve 74 (Fig. 2), and to connect the pipe 87 to the intake 78 of the motor. This latter connection can be effected by means of an ordinary slide valve such as 79 (Fig. 1). The pipe 87 leads to the central port of the casing 79ª of the slide valve 79. One end port is connected by pipe 94' to the pipe 75 leading to the intake 78, while the other port communicates with the atmosphere. The slide valve 79 has two positions, viz. one in which the pipe 94' is connected to the pipe 87 leading to the extension 82, and one in which the pipe 87 is connected to the atmosphere. In the position of the valve 79 shown in Fig. 1 the suction from intake 78 is admitted through pipes 75, 94', slide 79, and pipe 87 to the outer end of the extension 82, and the piston 83 will be drawn towards the right (Fig. 2) to retract plunger 81, since atmospheric pressure is admitted to the extension at the other side of the piston 83. In the other position of valve 79, pipe 87 will be connected through the valve to the atmosphere, this being the normal position of valve 79.

Having now particularly described and ascertained the nature of my invention and in what manner the same is to be performed I declare that what I claim is:—

1. In a graveling device of automobiles having an intake manifold and having a brake operating means; the combination of one or more gravel containers each having an outlet at one end; a valve for closing and opening each such outlet; an expansible chamber having a movable wall operatively connected with each said valve; each said valve being closed when the chamber is expanded; means for normally connecting the chamber to the atmosphere whereby said chamber is expanded, and for connecting the chamber to the intake manifold when the brake operating means is actuated whereby said valve is opened; a piston in each said container; and means for urging each piston towards the outlet end of its container comprising a cylinder attached to the end of each container opposite from the outlet end; a second piston connected with the first piston and slidable in said cylinder; means for normally connecting the end of such cylinder intermediate the pistons to the atmosphere and for connecting said end of the cylinder to the intake manifold when the brake operating means is actuated, the opposite end of said cylinder being exposed to the atmosphere.

2. In a graveling device for automobiles having an intake manifold and having a brake operating means; the combination of one or more gravel containers each having an outlet at one end; a valve for closing and opening each such outlet; an expansible chamber having a movable wall operatively connected with each said valve; each said valve being closed when the chamber is expanded; and means for normally connecting the chamber to the atmosphere whereby said chamber is expanded, and for connecting the chamber to the intake manifold when the brake operating means is actuated whereby said valve is opened; a piston in each said container; and means for urging each piston towards the outlet end of its container comprising a cylinder attached to the end of each container opposite from the outlet end; a second piston connected with the first piston and slidable in said cylinder; a tubular connection between the end of such cylinder intermediate the pistons and the expansible chamber whereby the pressure is the same for both the chamber and cylinder, the opposite end of the said cylinder being exposed to the atmosphere.

3. In a graveling device for automobiles having an intake manifold and having a brake operating means; the combination of one or more gravel containers each having an outlet at one end; a valve for closing and opening each such outlet; an expansible chamber having a movable wall operatively connected with each said valve; each said valve being closed when the chamber is expanded; a piston in each said container; a cylinder attached to the end of each container opposite from the outlet end; a second piston connected with the first piston and slidable in said cylinder; the outer end of said cylinder being open to the atmosphere; means for normally connecting the inner end of said cylinder intermediate the pistons and for normally connecting the expansible chamber to the atmosphere, to arrest movement of the pistons and to close the valve; and means operable when the brake operating means is actuated for connecting the chamber and the inner end of the cylinder intermediate the pistons to the intake manifold, to cause the valve to open and the pistons to move towards the outlet.

4. In a device as set forth in claim 3, a tubular connection between the inner end of said cylinder intermediate the pistons and the expansible chamber whereby the pressure is the same in both the chamber and cylinder.

ADOLF ERHARDT GEORG BERNER.